June 13, 1944.　　　M. M. TEUBER　　　2,351,238
DISPLAY DEVICE
Filed June 1, 1942　　　2 Sheets-Sheet 1

Max M. Teuber,
INVENTOR.

BY Lyon & Lyon
ATTORNEYS.

June 13, 1944.  M. M. TEUBER  2,351,238
DISPLAY DEVICE
Filed June 1, 1942  2 Sheets-Sheet 2

MAX M. TEUBER,
INVENTOR.
BY
Lyon & Lyon
ATTORNEYS.

Patented June 13, 1944

2,351,238

UNITED STATES PATENT OFFICE 2,351,238

DISPLAY DEVICE

Max M. Teuber, Los Angeles, Calif.

Application June 1, 1942, Serial No. 445,305

2 Claims. (Cl. 88—24)

This invention relates to display devices particularly useful for advertising purposes.

An object of the invention is to provide a relatively simple and inexpensive device for producing an extensive illuminated display.

Another object is to provide an attention-arresting novelty display.

Another object is to provide a clock display device for use in large rooms.

Another object is to provide an illuminated display device for providing relatively complete utilization of all the light from a lamp.

Another object is to provide a projection device for projecting still pictures which is readily adapted to project two images simultaneously on different walls.

Other specific objects and features of the invention will become apparent from the detailed description to follow of a particular embodiment of the invention.

Briefly, the invention consists of a casing containing a lamp adapted to illuminate lantern slides for projection on a surface such as a wall, ceiling, or floor, together with a clock, the face of which is also illuminated by the same lamp for projection onto another wall or surface. In addition, a substantial part of the lateral wall of the container may be formed of translucent panels bearing advertising matter adapted to be illuminated by the waste or spill light from the lamp. The apparatus also preferably includes a mirror for directing the projected image of the lantern slide in any one of a plurality of directions, and may include a magazine carrier supporting a plurality of slides, whereby different slides may be successively brought into action.

Referring to the drawings.

Figure 1:
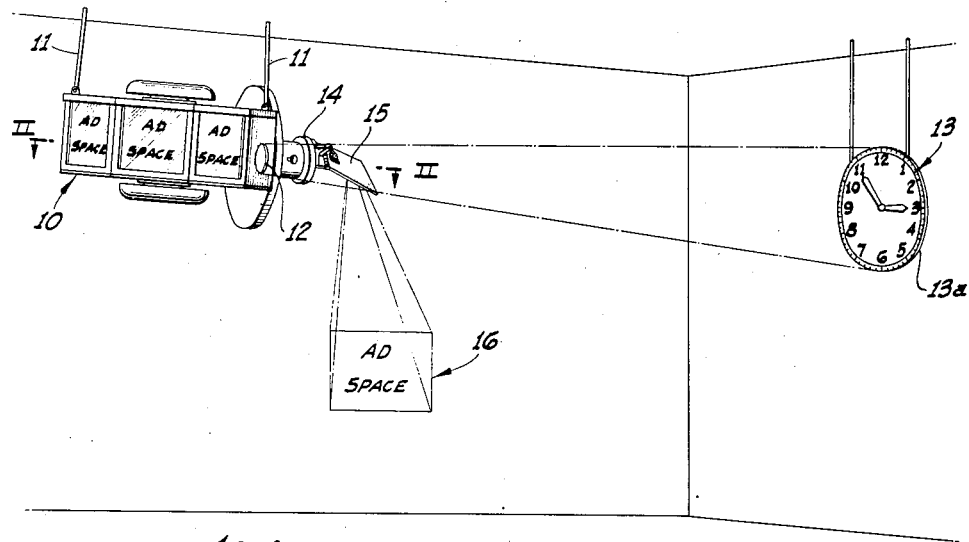
Fig. 1 is an elevation view of a projector in accordance with the invention, shown suspended within a room and projecting images on different walls of the room.

Referring first to Fig. 1, the projector therein disclosed comprises a case 10 adapted to be supported in midair by suspension rods or cords 11 and having a projection opening 12 through which an image 13 of a clock may be projected on a disc 13a suspended in the room in which the device is set up. The device also has a second projection opening in a lens barrel 14 extending from one side of the case 10 through which there is projected any suitable image from a lantern slide. An adjustable mirror 15 is preferably mounted on the end of the barrel 14 for directing the image 16 of the lantern slide in any one of a plurality of directions, so that it may fall on any one of several walls, on the floor, or on the ceiling. In Fig. 1 it is shown projected on a wall.

The case 10 is roughly prismatic in shape, having nine side walls or panels; two of these panels are utilized for the projection opening 12, and the lens barrel 14, respectively, and the rest may consist of transparencies bearing suitable display or advertising matter.

Figure 3:
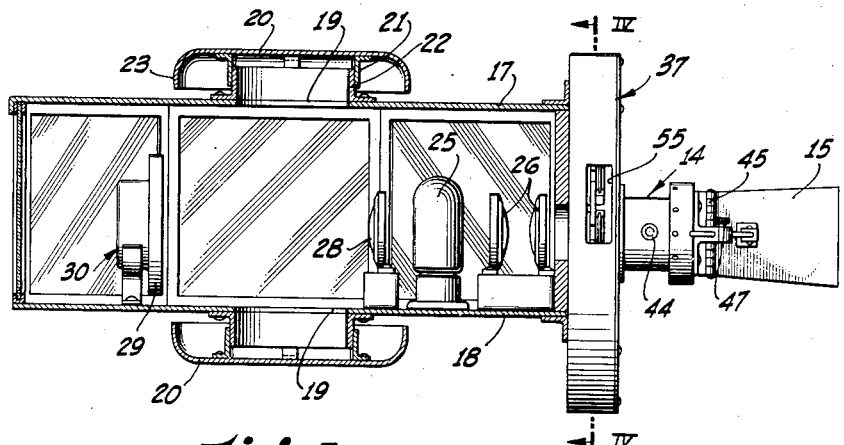
Fig. 3 is a vertical section taken along the broken line III—III of Fig. 2.

The top and bottom walls are preferably so constructed as not to pass any light, although it is desirable that they be open for the circulation of air to carry away excess heat from the lamp employed for illumination. Thus, as shown in Fig. 3, the top wall 17 and the bottom wall 18 may be imperforate, except for central openings 19 surmounted by cupolas 20. Each cupola 20 may be supported by brackets 21 from a short tube 22 extending outwardly around the opening 19. The skirt 23 of each cupola cooperates with the associated tube 22 to eliminate any direct path for light from the interior to the exterior of the case, while providing a path for the passage of ventilating air.

Figure 2:
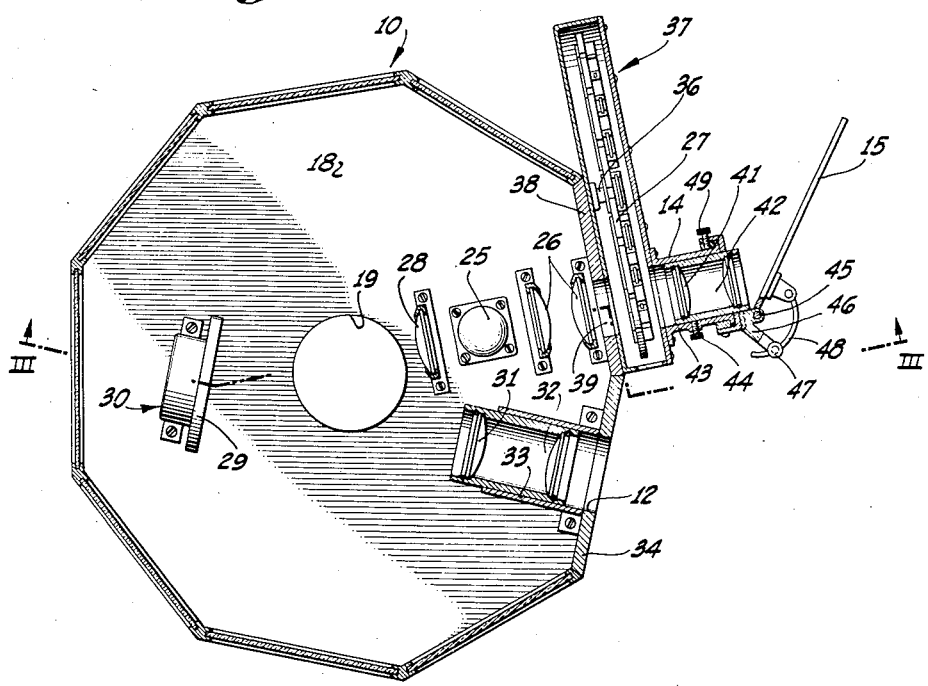
Fig. 2 is a horizontal section through the projector, taken substantially along the line II—II of Fig. 1.

Referring to Fig. 2, the optical elements within the case 10 consists of: a lamp 25; a pair of condensing lenses 26 for concentrating light from the lamp 25 on a lantern slide supported in a disc type carrier 27; a condensing lens 28 for concentrating light from the lamp 25 on the face 29 of a clock 30; and a pair of objective lenses 31 for projecting the illuminated dial 29 of the clock to form the image 13 of Fig. 1.

In order to secure a brilliant image of the clock, the dial 29 of the latter preferably consists of a mirror on which the hour numerals and the minute indicia are inscribed in dull black paint so as to show with as much relief as possible against the bright background of the dial. The hour numerals of the clock 30 are arranged in reverse order and the hands made to move in reverse direction, so that the image 13 simulates an actual clock.

The condensing lenses 26 and 28 may be mounted in suitable frames rising from the floor of the case. The objective lenses 31 are shown mounted in a barrel 32 which is slidable within a stationary barrel 33 and in juxtaposed relation to the projection opening 12 in one of the side panels 34 of the case. The barrel 32 can be slid back and forth within the barrel 33 to properly focus the image of the clock on a wall.

The magazine disc 27 for the lantern slides is rotatably mounted on a stub shaft 36 in a stationary drum 37 secured to one of the side panels 38 of the case. Light passing through the condensing lenses 26 passes through an opening 39 in the side panel 38 and onto a lantern slide 40 (Figs. 4 and 5) in the magazine disc 27 to illuminate the slide. An image of the slide is then focused on any suitable surface by a pair of objective lenses 41 mounted in a lens barrel 42 which is slidable in a stationary barrel 43 secured to the front wall of the drum 37. The lens barrel 42 can be slid back and forth in the tube 43 to properly focus the image, and can be locked in adjusted position by a thumb screw 44.

The mirror 15 is hingedly supported by a hinge pin 45 on a ring carrier 46 which is rotatably mounted on the tube 43 so that the mirror 15, in addition to being adjustable about the axis of the pivot 45, is also rotatably adjustable about the axis of the lens barrel. It may be locked in any position of adjustment about the hinge pin 45 by a locknut 47 cooperating with an arcuate arm 48, and may be locked in any position of rotation about the tube 43 by a thumb screw 49.

Figure 4:
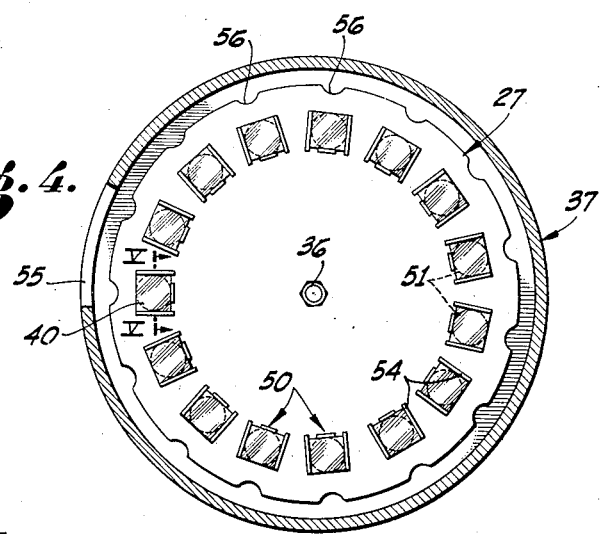
Fig. 4 is a vertical section in the plane IV—IV of Fig. 3.
Figure 5:
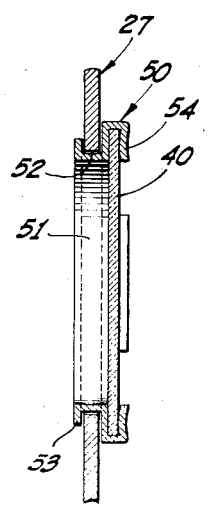
Fig. 5 is a detail section taken in the plane V—V of Fig. 4.

As best shown in Figs. 4 and 5, each slide 40 is supported in opposite grooves of a rectangular sheet metal carrier 50, which carrier has a large, central aperture, the edges of which are pressed rearwardly to define a barrel 51 fitting in a circular recess 52 in the carrier disc 27. The inner end portion of the barrel 51 is bent outwardly to define a flange 53 to retain the carrier in position on the disc 27, while permitting rotational adjustment of the carrier on the disc to properly orient the projected image. The grooves in the opposite edge of each slide holder 50 are preferably defined by resilient flanged edges 54 of the carrier, which frictionally engage the slides and hold them in position.

The magazine disc 27 is rotatable on the stub shaft 36 to bring different ones of the slides 40 into alignment with the projection system. Any desired method may be employed for shifting the disc 27 to change the slides. A relatively simple construction is shown in the drawings to permit manual rotation of the magazine disc 27 for this purpose. Thus, referring to Fig. 3, there is provided in the peripheral wall of the drum 37 a finger opening 55, and the edge of the disc 27 is provided with a plurality of recesses 56 spaced apart the same angular distance as the slides on the disc. It is therefore a simple matter to shift the disc a distance sufficient to bring the next successive slide into position by inserting a finger through the opening 55 into engagement with one of the recesses 56 and then moving the finger down through the length of the opening 55 while the finger remains engaged in the recess 56.

It is to be understood that although for the purpose of explaining the invention a particular embodiment thereof has been described in substantial detail, numerous changes from the exact construction shown in the drawings can be made without departing from the invention, which is to be limited only to the extent set forth in the appended claims.

I claim:

1. A device of the class described, comprising a casing, a clock in said casing having a reversed dial and hands moving in reverse direction, a lamp in said casing for illuminating said clock dial and an objective lens system in said casing on the same side of said dial as said lamp for projecting an image of the clock onto a distant surface, said clock dial consisting of a mirror having light absorbing numerals and hands and being so positioned with respect to said lamp as to reflect light from said lamp directly into said objective lens system.

2. A device as described in claim 1, including a condensing lens positioned between said lamp and said clock for concentrating substantially all of the light passing therethrough onto said mirror dial, the latter reflecting substantially all of the light so concentrated thereon into said objective lens system.

MAX M. TEUBER.